(12) United States Patent
Nakayama et al.

(10) Patent No.: US 9,297,543 B2
(45) Date of Patent: Mar. 29, 2016

(54) DEHUMIDIFICATION SYSTEM (71) Applicants: DAIKIN INDUSTRIES, LTD., Osaka-shi, Osaka (JP); DAIKIN APPLIED SYSTEMS CO., LTD., Tokyo (JP)

(72) Inventors: Hiroshi Nakayama, Osaka (JP); Toshiyuki Natsume, Osaka (JP); Naotoshi Fujita, Osaka (JP); Eisaku Okubo, Osaka (JP); Nobuki Matsui, Osaka (JP)

(73) Assignees: DAIKIN INDUSTRIES, LTD., Osaka-Shi (JP); DAIKIN APPLIED SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 14/646,487

(22) PCT Filed: Dec. 11, 2013

(86) PCT No.: PCT/JP2013/007301
§ 371 (c)(1),
(2) Date: May 21, 2015

(87) PCT Pub. No.: WO2014/103216
PCT Pub. Date: Jul. 3, 2014

(65) Prior Publication Data
US 2015/0300664 A1 Oct. 22, 2015

(30) Foreign Application Priority Data

Dec. 28, 2012 (JP) .................. 2012-288274

(51) Int. Cl.
*B01D 53/02* (2006.01)
*F24F 3/14* (2006.01)
(Continued)

(52) U.S. Cl.
CPC .............. *F24F 3/14* (2013.01); *B01D 53/0462* (2013.01); *B01D 53/261* (2013.01); *F24F 3/161* (2013.01); *F24F 2003/144* (2013.01); *F24F 2003/1464* (2013.01)

(58) Field of Classification Search
CPC .............. B01D 53/0462; B01D 53/261; F24F 2003/144; F24F 2003/1464; F24F 3/14; F24F 3/161
See application file for complete search history.

(56) References Cited

U.S. PATENT DOCUMENTS 3,619,987 A * 11/1971 Colvin .................. F24F 3/1423
96/111
6,828,235 B2 * 12/2004 Takano ............. H01L 21/67017
118/50

(Continued)

FOREIGN PATENT DOCUMENTS

JP 2001-038137 A 2/2001
JP 2002-320817 A 11/2002

(Continued)

OTHER PUBLICATIONS
International Search Report issued in PCT/JP2013/007301 dated Mar. 11, 2014.

*Primary Examiner* — Christopher P Jones
(74) *Attorney, Agent, or Firm* — Birch, Stewart, Kolasch & Birch, LLP (57) ABSTRACT

A dehumidification system for a dry clean room includes: a dry chamber supplied with air having a lower humidity than air in the dry clean room; a main dehumidification unit which supplies air to the dry clean room; and a terminal dehumidification unit which processes the air to be supplied from the dry clean room to the dry chamber, thus achieving energy saving and cost reduction for the dehumidification system for the dry clean room.

20 Claims, 9 Drawing Sheets (51) Int. Cl.
  *F24F 3/16*   (2006.01)
  *B01D 53/04*  (2006.01)
  *B01D 53/26*  (2006.01)

(56) References Cited

U.S. PATENT DOCUMENTS

2003/0172546 A1* 9/2003 Gomes .................. F24F 3/1411
                                                      34/330
2004/0187452 A1* 9/2004 Edo .................. H01L 21/67017
                                                      55/385.2
2005/0172805 A1* 8/2005 Motono ................. B01D 53/06
                                                       D53/6
2006/0086120 A1* 4/2006 Kashirajima ......... F24F 3/1423
                                                      62/271

FOREIGN PATENT DOCUMENTS

JP        3762138 B2     4/2006
JP      2011-064439 A    3/2011

* cited by examiner

DEHUMIDIFICATION SYSTEM

TECHNICAL FIELD

The present invention relates to a dehumidification system which supplies dehumidified air into a room.

BACKGROUND ART

Dehumidification systems which supply dehumidified air into a room have been known. Patent Documents 1 and 2 disclose dehumidification systems of this type.

Patent Documents 1 and 2 describe a configuration in which adsorption rotors are arranged in series along an air passage to form a plurality of stages there. The air passage is comprised of an air supply passage for supplying outdoor air processed by the adsorption rotors into a room, and an air discharge passage for discharging room air to the outside environment. Each of the adsorption rotors is disposed to cover both of the air supply passage and the air discharge passage, and be rotatable on a rotary shaft interposed between the air supply and discharge passages.

Each of the adsorption rotors adsorbs moisture in the air flowing through the air supply passage and thereby dehumidifies the air, and recovers itself by releasing the moisture to the air flowing through the air discharge passage. The air discharge passage is provided with an air heater, which heats the air so that the heated air can be used for the recovery of the adsorption rotor. When the amount of moisture adsorbed into a portion of the adsorption rotor increases to a certain degree, the adsorption rotor rotates and moves to the air discharge passage, where the adsorption rotor releases the moisture and recovers itself. After that, the adsorption rotor is used again for adsorption. With this configuration, low-humidity air flowing through the air passage for adsorption is continuously supplied into a room, thereby dehumidifying the air in the room. The room air is heated to recover the adsorption rotor, and then discharged out of the room.

Since the outdoor air passes through the adsorption rotor several times, the air to be supplied into the room comes to have a low dew point. Such air can be used, for example, as air to be supplied into a dry clean room where lithium ion batteries are manufactured (e.g., air having a dew point of about −50° C.).

CITATION LIST

Patent Document

Patent Document 1: Japanese Patent No. 3762138
Patent Document 2: Japanese Unexamined Patent Publication No. 2011-64439

SUMMARY OF THE INVENTION

Technical Problem

However, the system using a plurality of adsorption rotors needs a recovery heater for each of those adsorption rotors so that the respective adsorption rotors can form a dehumidification/recovery unit. In addition to the fact that the adsorption rotor itself is an expensive part, the heater needs to raise the temperature high enough to recover the adsorption rotor. This leads to an increase in running cost for generating such an amount of heat using the heater. Further, in the system using the adsorption rotors in multiple stages, the air having passed through the adsorption rotor for dehumidification has lower humidity. However, the temperature of this air rises due to not only the adsorption heat generated when the air passes through the adsorption rotor but also the heat generated by the heater for the recovery of the adsorption rotor. The air to be dehumidified therefore needs to be cooled at an inlet of the adsorption rotor, and some energy needs to be employed for such cooling, too.

Particularly in a process of manufacturing lithium ion batteries, an air conditioning system (a dehumidification system) dissipates about 50% of the total energy. Achieving energy saving in this system significantly contributes to a reduction in cost of the lithium ion batteries. However, in practice, the adsorption rotor uses so large an amount of heat for recovery that it is very difficult to reduce costs of the dehumidification system.

In view of the foregoing background, it is therefore an object of the invention to achieve energy saving and a cost reduction in a dehumidification system.

Solution to the Problem

A first aspect of the invention is directed to a dehumidification system having a dehumidifying device (40, 50) which supplies dehumidified air to a dry clean room (S1).

This dehumidification system includes a dry chamber (S2) to be supplied with air having a lower humidity than air in the dry clean room (S1). The dehumidifying device (40, 50) includes a main dehumidification unit (40) provided at an air supply passage (20) for supplying air to the dry clean room (S1), and a terminal dehumidification unit (50) which processes the air to be supplied to the dry chamber (S2). The main dehumidification unit (40) has a first adsorption member (43, 44) (45) capable of being switched to an adsorbing portion and a recovering portion. And the terminal dehumidification unit (50) has a second adsorption member (51, 52) capable of being switched to a dehumidifying portion which dehumidifies the air in the dry clean room (S1) and supplies the dehumidified air to the dry chamber (S2), and a recovering portion which is recovered by the air in the dry clean room (S1).

According to the conventional technologies, the air in the entire dry clean room (S1) is dehumidified to produce an environment with a dew point temperature of, e.g., −50° C. Unlike this, the first aspect of the invention provides a dry chamber (S2) in an area whom such an environment with as low a dew point temperature as −50° C. is really needed. Hence, as long as only the air in the dry chamber (S2) has as low a dew point as −50° C., the air to be supplied to the dry clean room (S1) may have a dew point temperature higher than −50° C. Further, the air in the dry clean room (S1) supplied from the main dehumidification unit (40) can be further processed by the terminal dehumidification unit (50), and then supplied to the dry chamber (S2). The air in the dry clean room (S1) is also used as air for recovering the recovering portion of the terminal dehumidification unit (50).

A second aspect of the invention is an embodiment of the first aspect of the invention. In the second aspect, the dry chamber (S2) is arranged in the dry clean room (S1).

According to the second aspect of the invention, the air in the dry clean room (S1) supplied from the main dehumidification unit (40) is further processed by the terminal dehumidification unit (50) to cause the air to have a low dew point temperature. Then that air is supplied to the dry chamber (S2) arranged in the dry clean room (S1).

A third aspect of the invention is an embodiment of the first aspect of the invention. In the third aspect, the dry chamber (S2) is arranged outside the dry clean room (S1).

According to the third aspect of the invention, the air in the dry clean room (S1) supplied from the main dehumidification unit (40) is further processed by the terminal dehumidification unit (50) to cause the air to have a low dew point temperature. Then that air is supplied to the dry chamber (S2) arranged outside the dry clean room (S1).

A fourth aspect of the invention is an embodiment of any one of the first to third aspects of the invention. In the fourth aspect, the dehumidification system has a recovery passage (32) which supplies air that has flowed out of the recovering portion of the terminal dehumidification unit (50) to the recovering portion of the main dehumidification unit (40).

According to the fourth aspect of the invention, the air that has recovered the terminal dehumidification unit (50) is used to recover the main dehumidification unit (40).

A fifth aspect of the invention is an embodiment of any one of the first to fourth aspects of the invention. In the fifth aspect, the main dehumidification unit (40) has a switchable dehumidification unit (41) and a rotor dehumidification unit (42). The switchable dehumidification unit (41) has, as the first adsorption member (43, 44), two adsorption heat exchangers (43, 44) which interchangeably function as an adsorber and recoverer. The switchable dehumidification unit (41) is configured to dehumidify air using the adsorption heat exchanger (43, 44) that serves as adsorber. The rotor dehumidification unit (42) has, as the first adsorption member (45), an adsorption rotor (45), part of which serves as an adsorbing portion and another part of which serves as a recovering portion. The rotor dehumidification unit (42) is configured to dehumidify the air dehumidified by the switchable dehumidification unit (41). The terminal dehumidification unit (50) has, as the second adsorption member (51, 52), two adsorption heat exchangers (51, 52) which interchangeably function as an adsorber and recoverer. The terminal dehumidification unit (50) is configured to dehumidify the air in the dry clean room (S1) using the adsorption heat exchanger (51, 52) that serves as adsorber and then supply the dehumidified air to the dry chamber (S2).

In the main dehumidification unit (40) according to the fifth aspect of the invention, the air that has been dehumidified by the switchable dehumidification unit (41), which includes the adsorption heat exchanger (43, 44), is supplied to, and further dehumidified by, the rotor dehumidification unit (42) having the adsorption rotor (45). The dehumidified air that has passed through the adsorption heat exchanger (43, 44) has a low humidity and a low temperature. This reduces the adsorption heat generated at the adsorption rotor (45). Further, the air in the dry clean room (S1) comes to have a low humidity and a low temperature since the terminal dehumidification unit (50), too, is a switchable dehumidification unit having the adsorption heat exchanger (51, 52).

A sixth aspect of the invention is an embodiment of any one of the first to fifth aspects of the invention. In the sixth aspect, a plurality of dry chambers (S2) are provided, and the terminal dehumidification unit (50) is provided for each of the plurality of dry chambers (S2).

According to the sixth aspect of the invention, each of the dry chambers (S2) is supplied with low dew point air processed by an associated one of the terminal dehumidification units (50).

Advantages of the Invention

The present invention enables the terminal dehumidification unit (50) to further process the air in the dry clean room (S1) supplied from the main dehumidification unit (40), and then supply the dehumidified air to the dry chamber (S2). This allows the air processed by the main dehumidification unit (40) to have a higher dew point temperature than the air to be supplied to the dry chamber (S2), thus reducing the power consumed by the main dehumidification unit (40) for dehumidifying the air. The higher dew point temperature of the air processed by the main dehumidification unit (40) allows for a reduction in the power consumption for the recovery, as well. Further, to recover the terminal dehumidification unit (50), the low due point air in the dry clean room (S1) is used, which enables efficient recovery of the terminal dehumidification unit (50), i.e., with reduced energy consumed for its recovery.

According to the second aspect of the invention, the air in the dry clean room (S1) is processed by the terminal dehumidification unit (50) and then supplied to the dry chamber (S2) arranged in the dry clean room (S1). Thus, the second aspect of the invention achieves energy saving, while satisfying the conditions imposed by the dry chamber (S2) that needs low dew point air.

According to the third aspect of the invention, the air in the dry clean room (S1) is processed by the terminal dehumidification unit (50) and then supplied to the dry chamber (S2) arranged outside the dry clean room (S1). Thus, the third aspect of the invention achieves energy saving, while satisfying the conditions imposed by the dry chamber (S2) that needs low dew point air.

According to the fourth aspect of the invention, the air that has recovered the terminal dehumidification unit (50) still has a low humidity. This air can therefore be used to recover the main dehumidification unit (40). This allows for a reduction in the heating energy to be dissipated for the recovery of the main dehumidification unit (40).

According to the fifth aspect of the invention, in the main dehumidification unit (40), the air that has been dehumidified by the switchable dehumidification unit (41), which includes the adsorption heat exchanger (43, 44), is supplied to, and further dehumidified by, the rotor dehumidification unit (42) having the adsorption rotor (45). The dehumidified air that has passed through the adsorption heat exchanger (43, 44) of the main dehumidification unit (40) has a low humidity and a low temperature. This reduces the adsorption heat generated by the adsorption rotor (45), and reduces the energy for recovering the adsorption rotor (45). Further, the air in the dry clean room (S1) has a low humidity and a low temperature since the terminal dehumidification unit (50), too, is a switchable dehumidification unit having the adsorption heat exchanger (51, 52). The energy for recovering the terminal dehumidification unit (50) and the main dehumidification unit (40) is therefore effectively reduced.

According to the sixth aspect of the invention, the terminal dehumidification unit (50) is provided for each of the dry chambers (S2). This allows for supplying air having a dew point temperature required for each individual one of the dry chambers (S2) on a one-to-one basis.

DESCRIPTION OF EMBODIMENTS

Embodiments of the present invention will now be descried in detail with reference to the drawings.

An embodiment of the present invention will be described.

Figure 1:
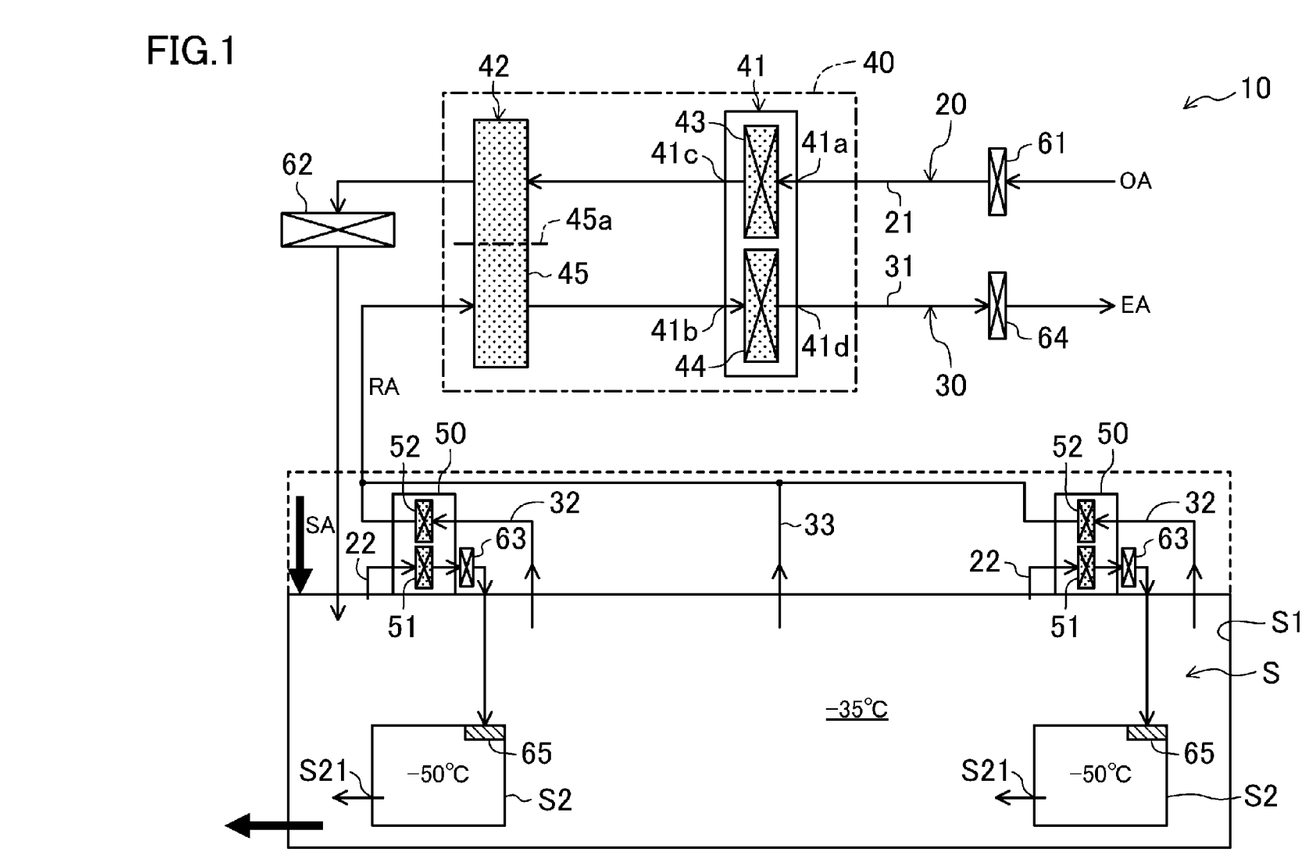
FIG. 1 shows a configuration for a dehumidification system according to an embodiment of the present invention.

The embodiment shown in FIG. 1 relates to a dehumidification system (10) which dehumidifies an indoor space (S). The dehumidification system (10) dehumidifies outdoor air (OA), and supplies the dehumidified air into a room as supply air (SA). The indoor space (S), which is a target of dehumidification, is a dry clean area in a manufacturing line of lithium ion batteries, where air is required to have a low dew point. The dehumidification system (10) in FIG. 1 forms part of the manufacturing line of lithium ion batteries.

The indoor space (S) includes a dry clean room (S1) and a dry chamber (S2). The dry chamber (S2) is provided at an area of the dry clean room (S1) where the air is required to have a particularly low dew point (i.e., air having a dew point temperature of −50° C. in the present embodiment). However, the air is not required to have a dew point temperature of −50° C. in the other area of the dry clean room (S1) except the dry chamber (S2). Therefore, the conditions are satisfied by supplying air having a dew point temperature of −35° C. Thus, the dry clean room (S1) includes such a dry chamber (S2) supplied with air having a lower dew point than the air in the dry clean room (S1). The dry chamber (S2) may be either a space that a person can walk in or a relatively small space which is too narrow for a worker to enter and which forces him or her to work with his/her hands put into it.

This dehumidification system (10) has an air supply passage (20) through which dehumidified outdoor air (OA) is supplied into the indoor space (S) as supply air (SA). The dehumidification system (10) further includes an air discharge passage (30) through which the room air (RA) in the dry clean room (S1) is discharged out of the room as exhaust air (EA).

The dehumidification system (10) has, as dehumidifying devices (40, 50), a main dehumidification unit (40) arranged at the air supply passage (20) to dehumidify the outdoor air (OA), and a terminal dehumidification unit (50) which processes the air to be supplied into the dry chamber (S2). The air supply passage (20) includes a first air supply passage (21) which passes through the main dehumidification unit (40), and a second air supply passage (22) which passes through the terminal dehumidification unit (50). Further, the air discharge passage (30) includes a first air discharge passage (31) which passes through the main dehumidification unit (40), and a second air discharge passage (32) which passes through the terminal dehumidification unit (50).

The first air supply passage (21) is a passage that supplies the air processed by the main dehumidification unit (40) to the dry clean room (S1). The second air supply passage (22) is a passage that allows the air in the dry clean room (S1) to pass through, and be processed by, the terminal dehumidification unit (50), and supplies the dehumidified air to the dry chamber (S2).

The second air discharge passage (32) is a passage that allows the air in the dry clean room (S1) to pass through the terminal dehumidification unit (50). The first air discharge passage (31) is a passage that allows the air that has passed through the terminal dehumidification unit (50) to pass through the main dehumidification unit (40) and then be discharged out of the room.

The main dehumidification unit (40) has a switchable dehumidification unit (41) and a rotor dehumidification unit (42). The switchable dehumidification unit (41) has two adsorption heat exchangers (43, 44) which interchangeably function as the adsorber and recoverer, and is configured to dehumidify the air using the adsorption heat exchanger (43, 44) that serves as adsorber. Each of the adsorption heat exchangers (43, 44) is an air heat exchanger having a fin supporting an adsorbent on its surface.

Although not shown in FIG. 1, the switchable dehumidification unit (41) adopts a structure that changes airflow in the casing, such that the air flowing through the first air supply passage (21) always passes through the adsorption heat exchanger (43, 44) serving as adsorber, and that the air flowing through the first air discharge passage (31) always passes through adsorption heat exchanger (44, 43) serving as recoverer. The pair of adsorption heat exchangers (43, 44) are configured as two heat exchangers in a refrigerant circuit. The direction of circulation of its refrigerant is reversed so that one heat exchanger serving as an evaporator and the other heat exchanger serving as a condenser switch roles with each other and interchangeably function as an adsorber and recoverer.

Figure 2:
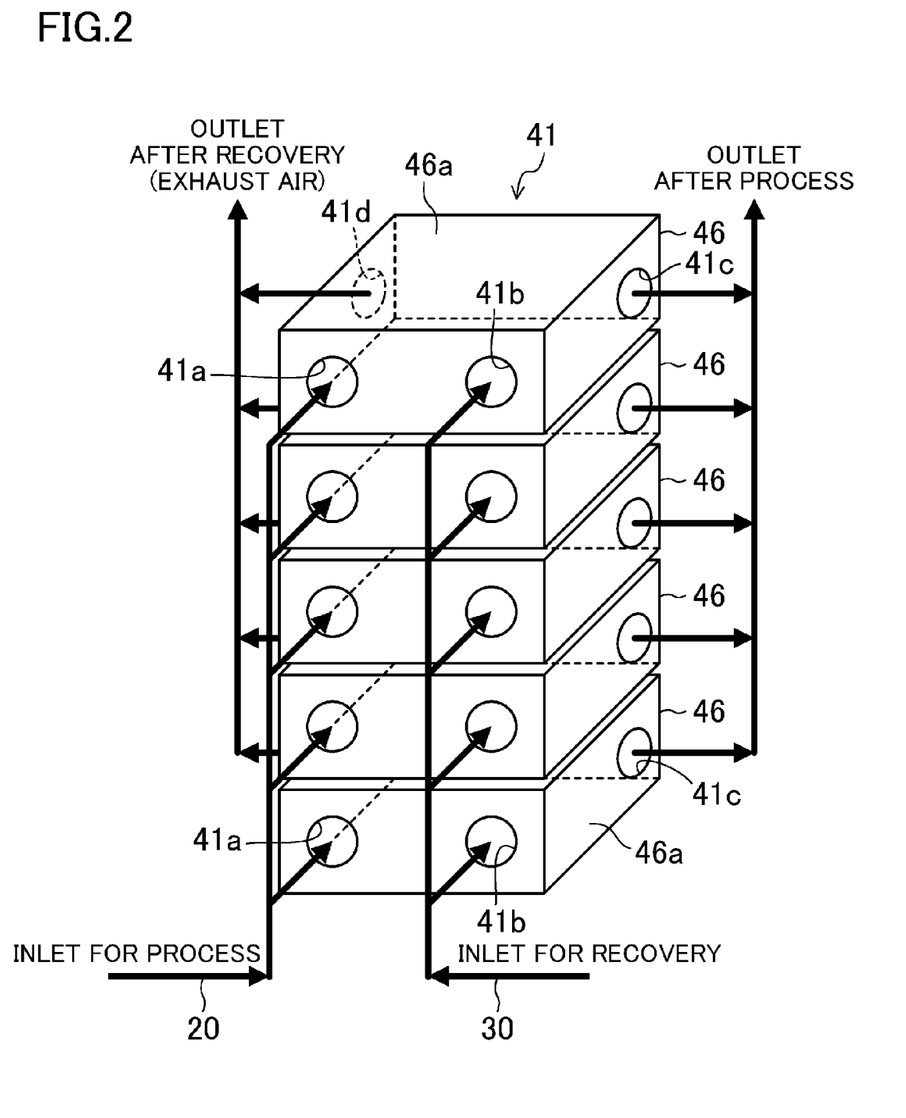
FIG. 2 is a perspective view schematically illustrating a configuration for a switchable dehumidification unit.

FIG. 2 illustrates a general configuration for the switchable dehumidification unit (41). The switchable dehumidification unit (41) is comprised of a plurality of subunits (46) (e.g., five subunits in this embodiment). Each of the subunits (46) has a box-like casing (46a), in which housed is the pair of adsorption heat exchangers (43, 44) not shown in FIG. 2.

The casing (46a) of each of the subunits (46) is provided with a processing inlet (41a) through which the outdoor air flows in, a recovery inlet (41b) through which air for recovery flows in, a processing outlet (41c) from which processed air flows out, and a recovery outlet (41d) from which exhaust air flows out. These subunits (46) are connected in parallel to the air supply passage (20) and the air discharge passage (30).

In this configuration, the outdoor air flowing through the air supply passage (20) branches off into multiple airflows to enter the respective subunits (46) through the processing inlets (41a). Each of the airflows is dehumidified by the adsorption heat exchanger (43, 44) serving as adsorber and then flows out through an associated one of the processing outlets (41c) to go downstream. Meanwhile, the room air flowing through the air discharge passage (30) branches off into multiple airflows to enter the respective subunits (46) through the recovery inlets (41b). Each of the airflows recovers the adsorption heat exchanger (44, 43) serving as recoverer before it flows out of the room through an associated one of the recovery outlets (41d). Each pair of adsorption heat exchangers (43, 44) interchangeably function as an adsorber and recoverer at predetermined intervals (e.g., at an interval of three minutes). In the casing (46a), airflows in the air passages are changed as the pair of adsorption heat exchangers (43, 44) switch roles between adsorber and recoverer.

The rotor dehumidification unit (42) has an adsorption rotor (45), which is configured so that a portion of the rotor (45) serves as an adsorbing portion and another portion thereof serves as a recovering portion. The adsorption rotor (45) is configured to rotate on a rotary shaft (45a). The adsorption rotor (45) includes an adsorbent loaded on the surface of its substrate with a honeycomb structure. A portion where the air flowing through the first air supply passage (21) passes is the adsorbing portion. A portion where the air flowing through the first air discharge passage (31) passes is the recovering portion. The air is dehumidified by the adsorption heat exchanger (43, 44) serving as adsorber in the switchable dehumidification unit (41), and is further dehumidified by the adsorbing portion of the adsorption rotor (45). Each of the adsorption heat exchangers (43, 44) and the adsorption rotor (45) is a first adsorption member that can be switched to an adsorbing portion and a recovering portion.

The terminal dehumidification unit (50) has two adsorption heat exchangers (51, 52) which interchangeably function as an adsorber and recoverer. The terminal dehumidification unit (50) is configured to dehumidify the air in the dry clean room (S1) using the adsorption heat exchanger (51, 52) that serves as adsorber, and supply the dehumidified air to the dry chamber (S2). Each of the adsorption heat exchangers (51, 52) of the terminal dehumidification unit (50) is a second adsorption member that can be switched to a dehumidifying portion, which dehumidifies the air in the dry clean room (S1) and supplies the dehumidified air to the dry chamber (S2), and a recovering portion, which is recovered by the air in the dry clean room.

A precooling heat exchanger (61) is arranged at the first air supply passage (21) upstream of the main dehumidification unit (40). A reheat heat exchanger (62) is arranged downstream of the main dehumidification unit (40). A second reheat heat exchanger (63) is arranged at the second air supply passage (22) downstream of the terminal dehumidification unit (50). An exhaust gas cooler heat exchanger (64) is arranged at the first air discharge passage (31) downstream of the main dehumidification unit (40).

A plurality of dry chambers (S2) are arranged in the dry clean room (S1). The terminal dehumidification unit (50) is provided for each of the dry chambers (32). Further, a moisture absorber (65) having a honeycomb structure is arranged at an air inlet of each of the dry chambers (S2) downstream of the second reheat heat exchanger (63). The dry chamber (S2) is provided with an outflow duct (S21) which allows the low dew point air in the dry chamber (S2) to flow out into the dry clean room (S1).

The second air discharge passage (32) is a recovery passage which supplies the air that has flowed out of the adsorption heat exchanger (52, 51) serving as the recovering portion of the terminal dehumidification unit (50), to the recovering portion of the main dehumidification unit (40). The dry clean room (S1) is provided with a third air discharge passage (33) from which the low dew point air in the dry clean room (S1) is discharged. The third air discharge passage (33) is connected to the second air discharge passage (32) downstream of the adsorption heat exchanger (52, 51) of the terminal dehumidification unit (50).

The precooling heat exchanger (61), the exhaust gas cooler heat exchanger (64), the reheat heat exchanger (62), and the second reheat heat exchanger (63) are connected to a refrigerant circuit of a heat recovery unit (not shown). That refrigerant circuit is configured to perform a refrigeration cycle using the reheat heat exchanger (62) and the second reheat heat exchanger (63) as condensers, and the precooling heat exchanger (61) and the exhaust gas cooler heat exchanger (64) as evaporators.

—Operation—

Figure 3:
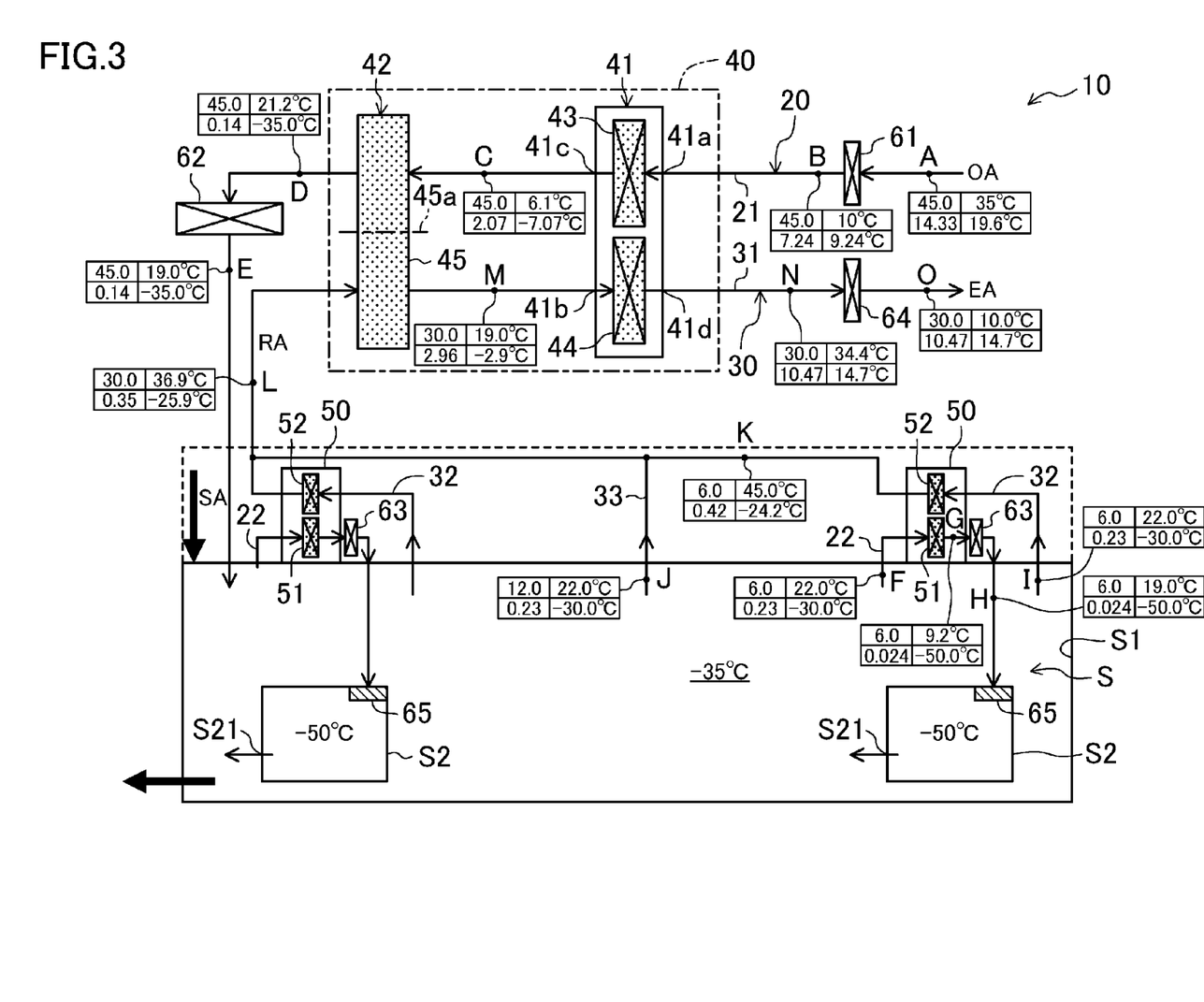
FIG. 3 shows the states of air in the dehumidification system of FIG. 1.
Figure 4:
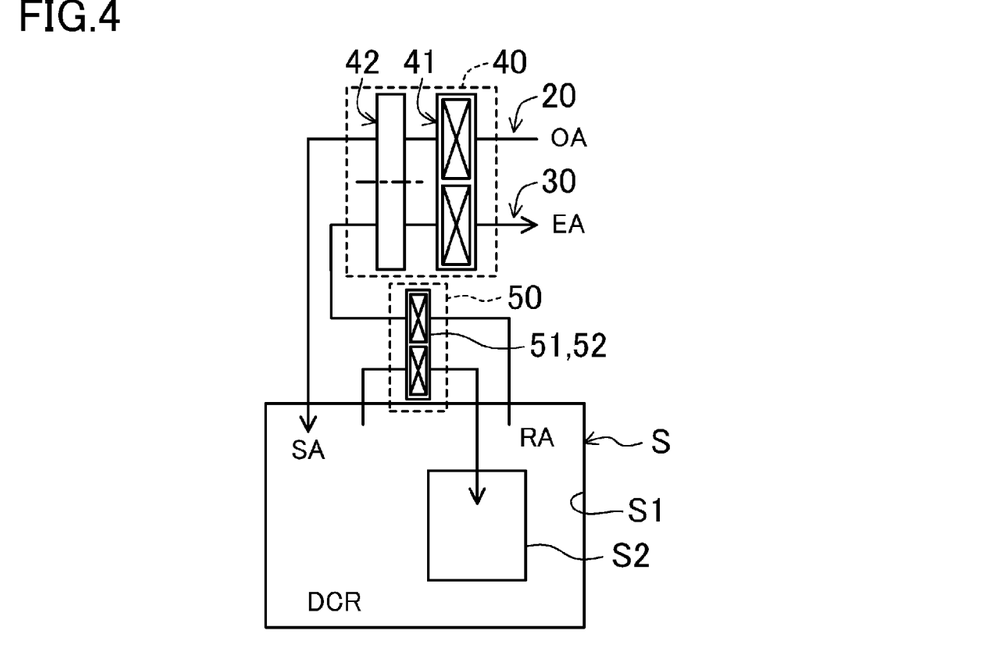
FIG. 4 illustrates a general configuration for the dehumidification system of FIG. 1.

The operation of this dehumidification system (10) will now be described. FIG. 3 shows the state of air at Points A through O. FIG. 4 illustrates a simplified version of the dehumidification system (10). The four cells attached to each of the points in FIG. 3 indicate the air flow rate ($m^3$/min) in the upper left cell, the absolute humidity (g/kg) in the lower left cell, the dry-bulb temperature DB (° C.) in the upper right cell, and the dew point temperature DP (° C.) in the lower right cell, respectively.

The outdoor air flowing through Point A on the air supply passage (20) is cooled and dehumidified by the precooling heat exchanger (61), and thereafter flows in the main dehumidification unit (40), where the air is dehumidified. The air changes its state as the air sequentially goes through Points B, C, D and E, to be air with a dew point temperature of −35° C. This air is then supplied to the dry clean room (S1). The air at Point F in the dry clean room (S1) passes through the terminal dehumidification unit (50). As a result, this air changes its state from Point G to Point H to have a dew point temperature of −50° C., and then is supplied to the dry chamber (S2). The air in the dry chamber (S2) is continually released to the dry clean room (S1).

The terminal dehumidification unit (50) changes the state of the air at Point I to the state of the air at Point K. The air at Point K is mixed with the air at Point J, which causes the air to have the state at Point I, on the air discharge passage (30). The state of the air at Point L shown in FIG. 3 is an example state in which three terminal dehumidification units (50) are used. The air at Point L passes through the main dehumidification unit (40) and the exhaust gas cooler heat exchanger (64), and then changes its state as the air sequentially goes through Points M, N and O. Finally, the air is discharged from the air discharge passage (30) to out of the room.

Advantages of Embodiment

According to the embodiment described above, the air that has been supplied to the dry clean room (S1) from the main dehumidification unit (40) is further processed by the terminal dehumidification unit (50) before it is supplied to the dry chamber (S2). This configuration allows the air processed by the main dehumidification unit (40) to have a higher dew point temperature than the air to be supplied to the dry chamber (S2). The power consumption for the dehumidification is therefore reduced.

In addition, this configuration also allows the air processed by the main dehumidification unit (40) to have a higher dew point temperature than the air required by the dry chamber (S2). Thus, less moisture is released for recovery, and the power consumption for the recovery is reduced as a result. In particular, this embodiment does not require heating the air at Point L for recovery of the main dehumidification unit (40), since the air that has recovered the terminal dehumidification unit (50) has a low humidity.

In the main dehumidification unit (40), the air that has passed through, and been dehumidified by, the switchable dehumidification unit (41), which includes the adsorption heat exchanger (43, 44), has a low humidity and a low temperature when it is going to be dehumidified by the adsorption rotor (45) of the rotor dehumidification unit (42). This reduces the adsorption heat generated by the adsorption rotor (45), and reduces the energy for recovering the adsorption rotor (45).

A switchable dehumidification unit having the adsorption heat exchangers (51, 52) is used as the terminal dehumidification unit (50), which allows the air in the dry clean room (S1) to have a low humidity and a low temperature. In addition, to recover the terminal dehumidification unit (50), the low dew point air in this dry clean room (S1) is used, which enables efficient recovery of the terminal dehumidification unit (50), i.e., with reduced energy consumed for its recovery.

Furthermore, in the present embodiment, the terminal dehumidification unit (50) is provided for each of the dry chambers (S2). Each of these terminal dehumidification units (50) provides air having a dew point temperature required for each of the dry chambers (S2) with reliability. Further, the moisture absorber (65) arranged at the air inlet of the dry chamber (S2) to which air flows from the terminal dehumidification unit (50) reduces a variation in temperature and humidity with time.

Other Embodiments

The above embodiment may have the following structures.

Figure 5:
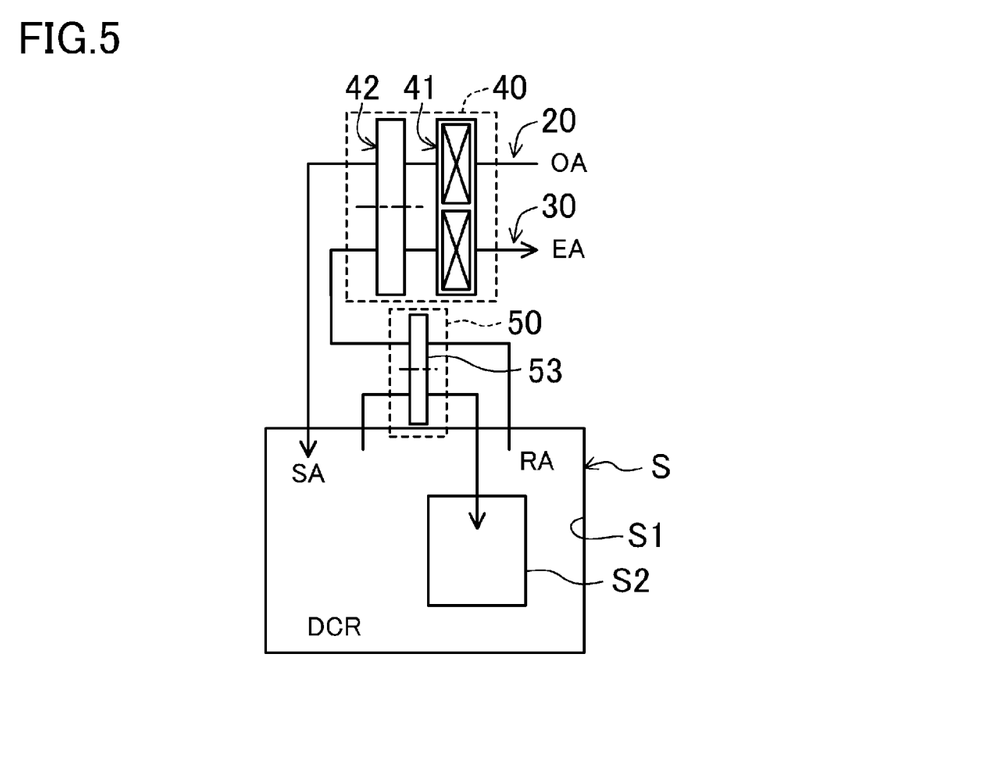
FIG. 5 illustrates a general configuration for a dehumidification system according to a first variation.

A first variation shown in FIG. 5 is an example in which the terminal dehumidification unit (50) of the embodiment shown in FIG. 4 is configured as an adsorption rotor (53), instead of the adsorption heat exchangers (51, 52). This configuration also uses the main dehumidification unit (40) and the terminal dehumidification unit (50), and thereby allows the air processed by the main dehumidification unit (40) to have a higher dew point temperature than the air to be supplied to the dry chamber (S2). Power consumption for the dehumidification is therefore reduced, so is power consumption for the recovery.

Figure 6:
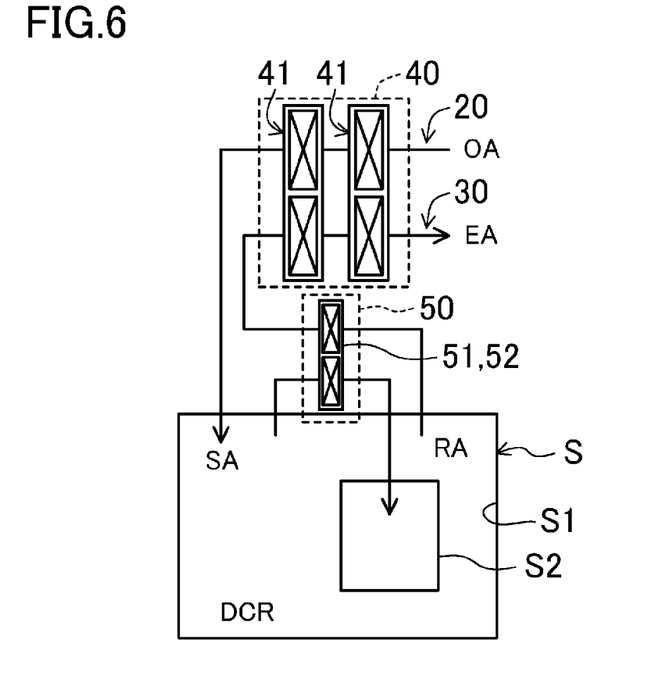
FIG. 6 illustrates a general configuration for a dehumidification system according to a second variation.
Figure 7:
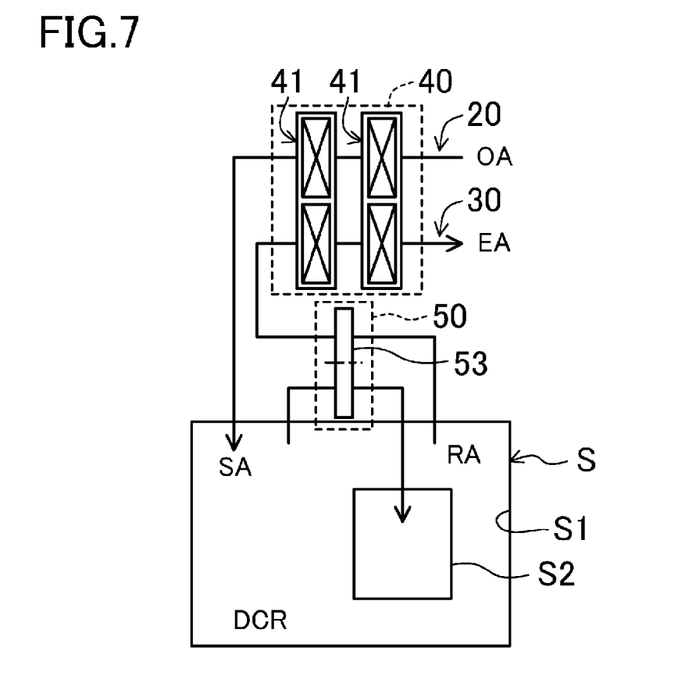
FIG. 7 illustrates a general configuration for a dehumidification system according to a third variation.

A second variation shown in FIG. 6 is an example in which the main dehumidification unit (40) of the embodiment shown in FIG. 4 is configured as two switchable dehumidification units (41). Further, a third variation shown in FIG. 7 is an example in which the terminal dehumidification unit (50) of the second variation shown in FIG. 6 is configured as an adsorption rotor (53).

Figure 8:
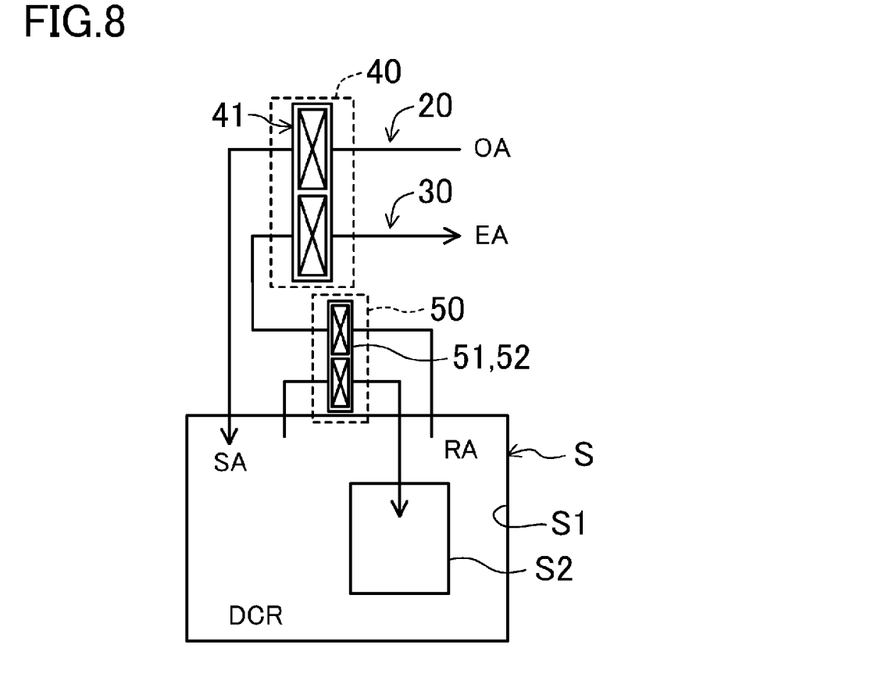
FIG. 8 illustrates a general configuration for a dehumidification system according to a fourth variation.
Figure 9:
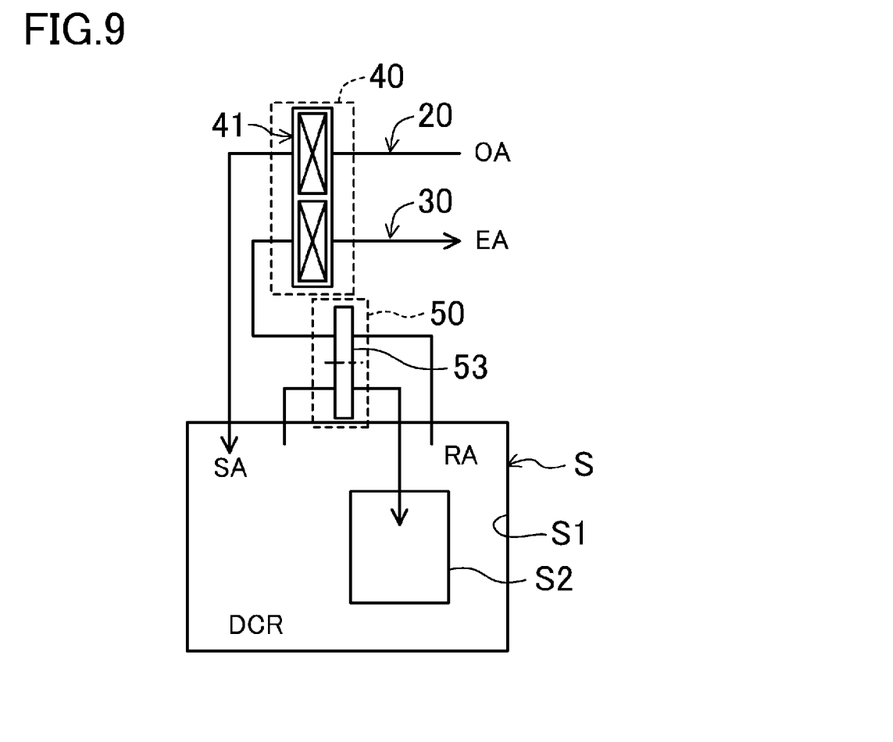
FIG. 9 illustrates a general configuration for a dehumidification system according to a fifth variation.

A fourth variation shown in FIG. 8 is an example in which the main dehumidification unit (40) of the embodiment shown in FIG. 4 is configured as a single switchable dehumidification unit (41). A fifth variation shown in FIG. 9 is an example in which the terminal dehumidification unit (50) of the fourth variation shown in FIG. 8 is configured as an adsorption rotor (53).

Figure 10:
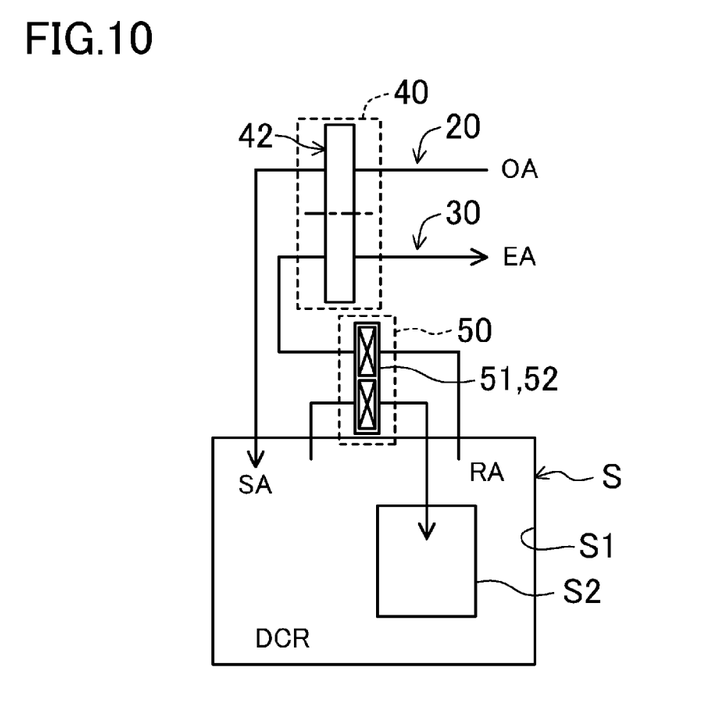
FIG. 10 illustrates a general configuration for a dehumidification system according to a sixth variation.
Figure 11:
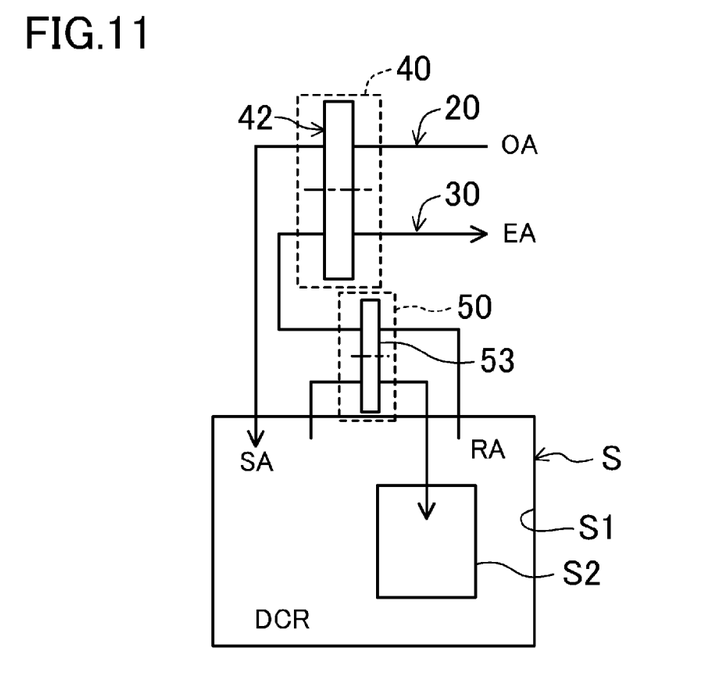
FIG. 11 illustrates a general configuration for a dehumidification system according to a seventh variation.

A sixth variation shown in FIG. 10 is an example in which the main dehumidification unit (40) of the embodiment shown in FIG. 4 is configured as a single rotor dehumidification unit (42). A seventh variation shown in FIG. 11 is an example in which the terminal dehumidification unit (50) of the sixth variation shown in FIG. 10 is configured as an adsorption rotor (53).

The second to seventh variations also use the main dehumidification unit (40) and the terminal dehumidification unit (50), and thereby allow the air processed by the main dehumidification unit (40) to have a higher dew point temperature than the air to be supplied to the dry chamber (S2). Power consumption for the dehumidification is therefore reduced, so is power consumption for the recovery.

The first embodiment shown in FIG. 1 to FIG. 3 is a system configuration having the dry chambers (S2) arranged in the dry clean room (S1). However, the dry chambers (S2) may also be arranged outside the dry clean room (S1) as shown in FIGS. 12 and 13.

Figure 12:
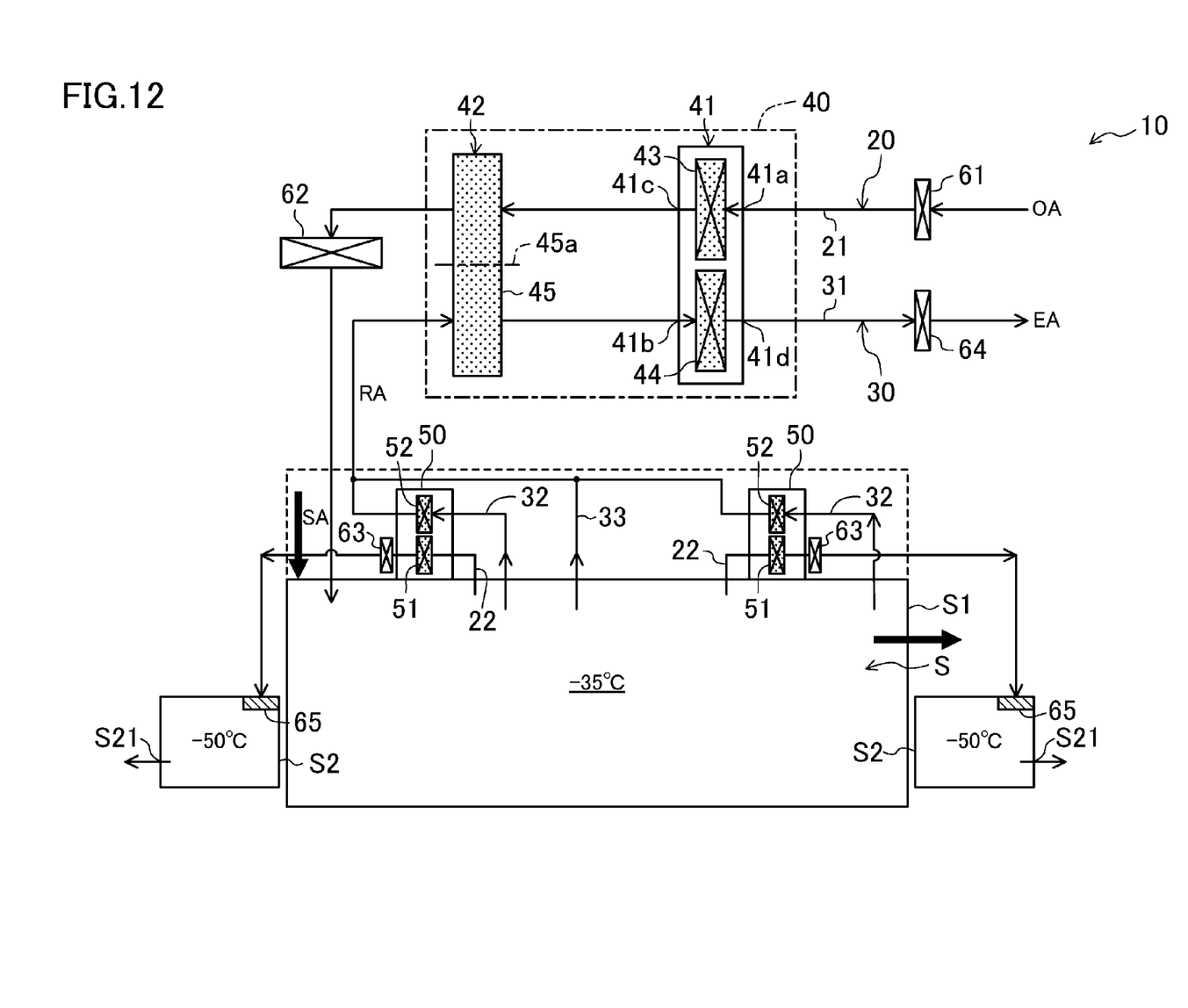
FIG. 12 illustrates a general system configuration for a dehumidification system according to an eighth variation.
Figure 13:
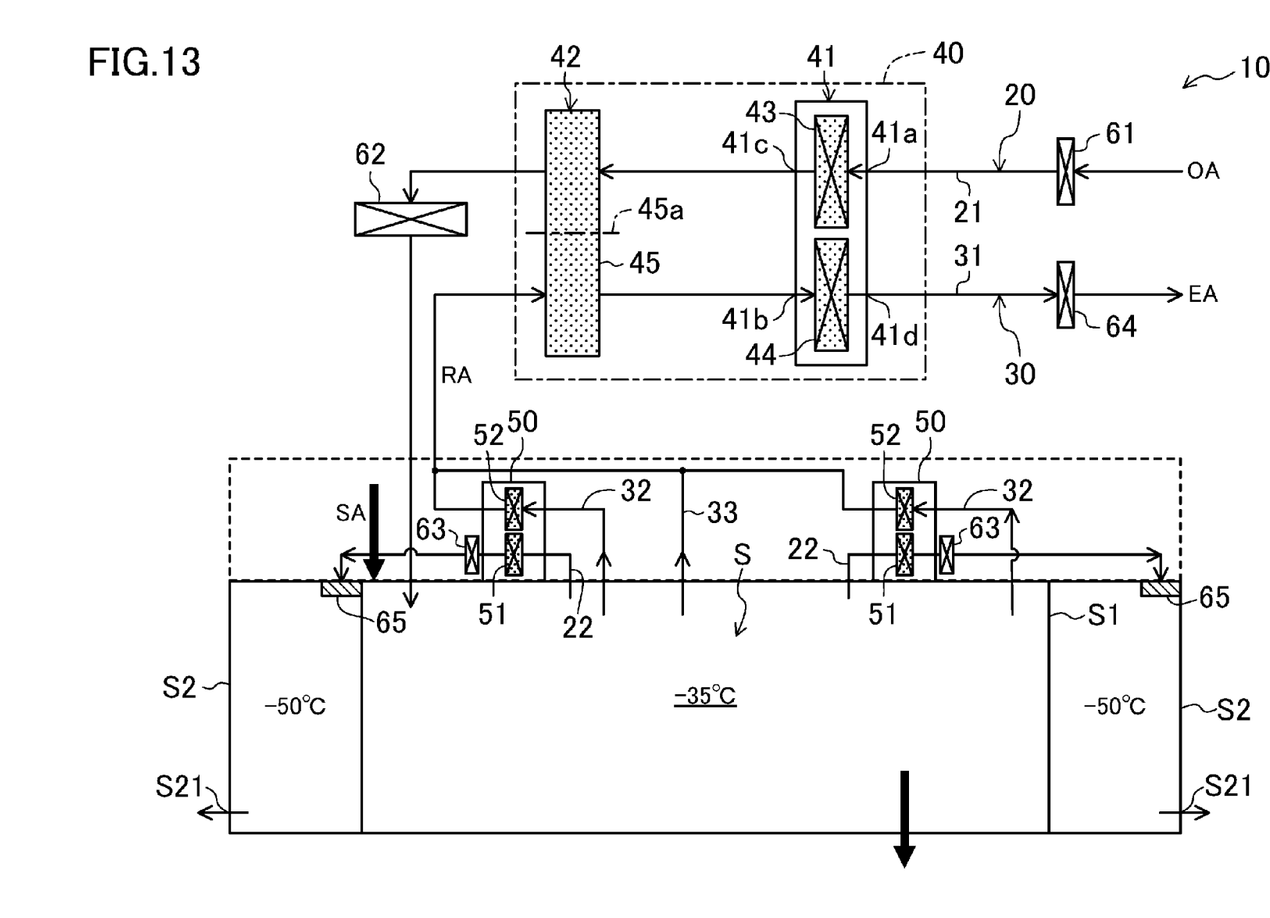
FIG. 13 illustrates a general system configuration for a dehumidification system according to a ninth variation.

An eighth variation shown in FIG. 12 is an example in which the dry chambers (S2) are arranged close to, not adjacent to, the dry clean room (S1). A ninth variation shown in FIG. 13 is an example in which the dry chambers (S2) are right next to the dry clean room (S1), which means that the dry chambers (S2) are rooms adjacent to the dry clean room (S1).

The eighth and ninth variations have the same configuration as the example in FIG. 1, except the installation state of the dry chambers (S2), the configuration of the second air supply passage (22) connecting the terminal dehumidification unit (50) to an associated one of the dry chambers (S2), and the configuration of the outflow duct (S21) discharging the air in each of the dry chambers (S2) out of the room.

In the configurations of the eighth and ninth variations, the air that is dehumidified by the main dehumidification unit (40) to have a dew point temperature of −35° C. is supplied to the dry clean room (S1). The air in the dry clean room (S1) is further dehumidified by the terminal dehumidification unit (50) to have a dew point temperature of −50° C. This air is supplied through the respective second air supply passages (22) to the dry chambers (S2) arranged outside the dry clean room (S1). The airflow passing through the other passages is the same as that of the embodiment shown in FIG. 1 to FIG. 3.

According to the eighth and ninth variations, the air in the dry clean room (S1) is processed by the terminal dehumidification unit (50) and then supplied to an associated one of the dry chambers (S2) arranged outside the dry clean room (S1). Thus, as in the embodiment described above, these variations achieve energy saving, while satisfying the conditions imposed by the dry chamber (S2) that needs low dew point air.

The foregoing embodiments are only preferred examples in nature, and are not intended to limit the scope, applications, and use of the invention. For example, the states of the air at the respective points shown in FIG. 3 may vary depending on the dew point temperature of the air required in the dry clean room and the dry chamber, and the specific configuration of the dehumidifying device.

INDUSTRIAL APPLICABILITY

As can be seen from the foregoing description, the present invention is useful for a dehumidification system which supplies dehumidified air into a room.

DESCRIPTION OF REFERENCE CHARACTERS 10 dehumidification system
20 air supply passage
32 recovery passage
40 main dehumidification unit (dehumidifying device)
41 switchable dehumidification unit
42 rotor dehumidification unit
43 adsorption heat exchanger (first adsorption member)
44 adsorption heat exchanger (first adsorption member)
45 adsorption rotor (first adsorption member)
50 terminal dehumidification unit (dehumidifying device)
51 adsorption heat exchanger (second adsorption member)
52 adsorption heat exchanger (second adsorption member)
S1 dry clean room
S2 dry chamber

The invention claimed is:
1. A dehumidification system having a dehumidifying device which supplies dehumidified air to a dry clean room, wherein
the dehumidification system includes a dry chamber to be supplied with air having a lower humidity than air in the dry clean room, the dehumidifying device includes a main dehumidification unit provided at an air supply passage for supplying air to the dry clean room, and a terminal dehumidification unit which processes the air to be supplied to the dry chamber, the main dehumidification unit has a first adsorption member capable of being switched to an adsorbing portion and a recovering portion, and the terminal dehumidification unit has a second adsorption member capable of being switched to a dehumidifying portion which dehumidifies the air in the dry clean room and supplies the dehumidified air to the dry chamber, and a recovering portion which is recovered by the air in the dry clean room.

2. The dehumidification system of claim 1, wherein the dry chamber is arranged in the dry clean room.

3. The dehumidification system of claim 1, wherein the dry chamber is arranged outside the dry clean room.

4. The dehumidification system of claim 1, wherein the dehumidification system has a recovery passage which supplies air that has flowed out of the recovering portion of the terminal dehumidification unit to the recovering portion of the main dehumidification unit.

5. The dehumidification system of claim 1, wherein the main dehumidification unit has a switchable dehumidification unit and a rotor dehumidification unit, the switchable dehumidification unit has, as the first adsorption member, two adsorption heat exchangers which interchangeably function as an adsorber and recoverer, the switchable dehumidification unit being configured to dehumidify air using the adsorption heat exchanger that serves as adsorber, the rotor dehumidification unit has, as the first adsorption member, an adsorption rotor, part of which serves as an adsorbing portion and another part of which serves as a recovering portion, the rotor dehumidification unit being configured to dehumidify the air dehumidified by the switchable dehumidification unit, and the terminal dehumidification unit has, as the second adsorption member, two adsorption heat exchangers which interchangeably function as an adsorber and recoverer, the terminal dehumidification unit being configured to dehumidify the air in the dry clean room using the adsorption heat exchanger that serves as adsorber and supply the dehumidified air to the dry chamber.

6. The dehumidification system claim 1, wherein a plurality of dry chambers are provided, and the terminal dehumidification unit is provided for each of the plurality of dry chambers.

7. The dehumidification system of claim 2, wherein the dehumidification system has a recovery passage which supplies air that has flowed out of the recovering portion of the terminal dehumidification unit to the recovering portion of the main dehumidification unit.

8. The dehumidification system of claim 3, wherein the dehumidification system has a recovery passage which supplies air that has flowed out of the recovering portion of the terminal dehumidification unit to the recovering portion of the main dehumidification unit.

9. The dehumidification system of claim 2, wherein the main dehumidification unit has a switchable dehumidification unit and a rotor dehumidification unit, the switchable dehumidification unit has, as the first adsorption member, two adsorption heat exchangers which interchangeably function as an adsorber and recoverer, the switchable dehumidification unit being configured to dehumidify air using the adsorption heat exchanger that serves as adsorber, the rotor dehumidification unit, as the first adsorption member, an adsorption rotor, part of which serves as an adsorbing portion and another part of which serves as a recovering portion, the rotor dehumidification unit being configured to dehumidify the air dehumidified by the switchable dehumidification unit, and the terminal dehumidification unit has, as the second adsorption member, two adsorption heat exchangers which interchangeably function as an adsorber and recoverer, the terminal dehumidification unit being configured to dehumidify the air in the dry clean room using the adsorption heat exchanger that serves as adsorber and supply the dehumidified air to the dry chamber.

10. The dehumidification system of claim 3, wherein the main dehumidification unit has a switchable dehumidification unit and a rotor dehumidification unit, the switchable dehumidification unit has, as the first adsorption member, two adsorption heat exchangers which interchangeably function as an adsorber and recoverer, the switchable dehumidification unit being configured to dehumidify air using the adsorption heat exchanger that serves as adsorber, the rotor dehumidification unit has, as the first adsorption member, an adsorption rotor, part of which serves as an adsorbing portion and another part of which serves as a recovering portion, the rotor dehumidification unit being configured to dehumidify the air dehumidified by the switchable dehumidification unit, and the terminal dehumidification unit has, as the second adsorption member, two adsorption heat exchangers which interchangeably function as an adsorber and recoverer, the terminal dehumidification unit being configured to dehumidify the air in the dry clean room using the adsorption heat exchanger that serves as adsorber and supply the dehumidified air to the dry chamber.

11. The dehumidification system of claim 7, wherein the main dehumidification unit has a switchable dehumidification unit and a rotor dehumidification unit, the switchable dehumidification unit has, as the first adsorption member; two adsorption heat exchangers which interchangeably function as an absorber and recoverer, switchable dehumidification unit being configured to dehumidify air using the adsorption heat exchanger that serves as adsorber, the rotor dehumidification unit has, as the first adsorption member, an adsorption rotor, part of which serves as an adsorbing portion and another part of which serves as a recovering portion, the rotor dehumidification unit being configured to dehumidify the air dehumidified by the switchable dehumidification unit, and the terminal dehumidification unit has, as the second adsorption member, two adsorption heat exchangers which interchangeably function as an adsorber and recoverer, the terminal dehumidification unit being configured to dehumidify the air in the dry clean room using the adsorption heat exchanger that serves as adsorber and supply the dehumidified air to the dry chamber.

12. The dehumidification system of claim 8, wherein the main dehumidification unit has a switchable dehumidification unit and a rotor dehumidification unit, the switchable dehumidification unit has, as the first adsorption member, two adsorption heat exchangers which interchangeably function as an adsorber and recoverer, the switchable dehumidification unit being configured to dehumidify air using the adsorption heat exchanger that serves as adsorber, the rotor dehumidification unit has, as the first adsorption member, an adsorption rotor, part of which serves as an adsorbing portion and another part of which serves as a recovering portion, the rotor dehumidification unit being configured to dehumidify the air dehumidified by the switchable dehumidification unit, and the terminal dehumidification unit has, as the second adsorption member, two adsorption heat exchangers which interchangeably function as an adsorber and recoverer, the terminal dehumidification unit being configured to dehumidify the air in the dry clean room using the adsorption heat exchanger that serves as adsorber and supply the dehumidified air to the dry chamber.

13. The dehumidification system of claim 2, wherein a plurality of dry chambers are provided, and the terminal dehumidification unit is provided for each of the plurality of dry chambers.

14. The dehumidification system of claim 3, wherein a plurality of dry chambers are provided, and the terminal dehumidification unit is provided for each of the plurality of dry chambers.

15. The dehumidification system of claim 7, wherein a plurality of dry chambers are provided, and the terminal dehumidification unit is provided for each of the plurality of dry chambers.

16. The dehumidification system of claim 8, wherein a plurality of dry chambers are provided, and the terminal dehumidification unit is provided for each of the plurality of dry chambers.

17. The dehumidification system of claim 9, wherein a plurality of dry chambers are provided, and the terminal dehumidification unit is provided for each of the plurality of dry chambers.

18. The dehumidification system of claim 10, wherein a plurality of dry chambers are provided, and the terminal dehumidification unit is provided for each of the plurality of dry chambers.

19. The dehumidification system of claim 11, wherein a plurality of dry chambers are provided, and the terminal dehumidification unit is provided for each of the plurality of dry chambers.

20. The dehumidification system of claim 12, wherein a plurality of dry chambers are provided, and the terminal dehumidification unit is provided for each of the plurality of dry chambers.

* * * * *